Dec. 9, 1958  E. A. SCHUMACHER ET AL  2,863,789
ELECTROLYTE FOR AN AIR-DEPOLARIZED CELL
Filed Jan. 13, 1954
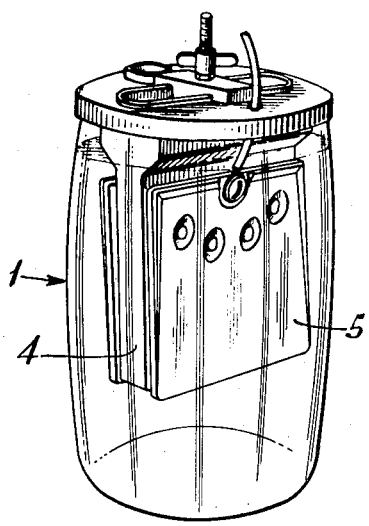
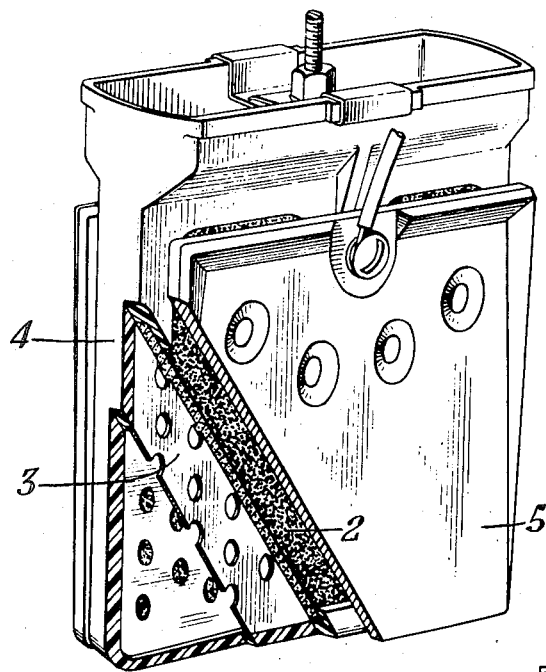
INVENTORS
ERWIN A. SCHUMACHER
GEORGE W. HEISE
BY
ATTORNEY

United States Patent Office 2,863,789
Patented Dec. 9, 1958

2,863,789

ELECTROLYTE FOR AN AIR-DEPOLARIZED CELL

Erwin A. Schumacher, Parma, and George W. Heise, Fairview Park, Ohio, assignors to Union Carbide Corporation, a corporation of New York Application January 13, 1954, Serial No. 403,926

4 Claims. (Cl. 136—154)

This invention relates to an air-depolarized cell and more particularly to an improved electrolyte for use in such a cell. The conventional electrolyte used with air-depolarized cells is alkaline, usually consisting primarily of sodium hydroxide. Such electrolytes give satisfactory performance under normal operating conditions. However, at high discharge rates or low temperatures certain deficiencies and limitations arise due to the composition of the electrolyte.

It is a principal object of the present invention to provide an electrolyte suitable for use in an air-depolarized cell which permits the efficient operation of the cell at high discharge rates and at low temperatures.

It is a further object of the invention to provide an electrolyte which in combination with a plastic-bonded, carbon electrode in an air-depolarized cell gives improved cell performance at low temperatures.

Still another object of the invention is to provide an improved air-depolarized cell comprising a plastic-bonded carbon electrode, the electrolyte of the invention and either a peroxide decomposition catalyst, an electrolyte regenerator or both.

The cathode reaction in air-depolarized cells which have an alkaline electrolyte results in the formation of peroxide. Ordinarily the peroxide decomposes rapidly enough to prevent its assuming a harmful concentration. Often, however, when such cells are discharged at a high rate or are used at low temperatures or both, the decomposition of the peroxide does not keep pace with the formation of the peroxide. Under these conditions, the concentration of peroxide in the electrolyte becomes in time such that insoluble peroxide is separated from the electrolyte and crystallizes in the pores of the carbon cathode. The presence of this crystalline peroxide in the carbon cathode tends to bring about the disintegration of the cathode and results eventually in the failure of the cell. This tendency and eventuality have heretofore been a serious barrier to the use of air-depolarized cells at high discharge rates and at low temperatures.

Efforts to promote the decomposition of the peroxide have in the past entailed the inclusion of decomposition catalysts in the electrode material. Platinum, oxides of either osmium, nickel, or cobalt, and hydroxides or oxides of lead, copper, and manganese are examples of catalysts that may be used for this purpose. The effectiveness of such catalysts in the conventional electrodes, while measurable, leaves much to be desired when a cell with an electrolyte of sodium hydroxide is operated under extreme service conditions.

Peroxide is more soluble in potassium hydroxide than in sodium hydroxide. The use of potassium hydroxide as the alkaline constituent of an alkaline electrolyte results in the improved performance of an air-depolarized cell since the increased solubility of the peroxide in the potassium hydroxide lessens the tendency of the peroxide to crystallize and become separated from the electrolyte. But potassium hydroxide when used alone as the alkaline constituent of the electrolyte often leads to excessive wasteful zinc corrosion due to an increase in the peroxide content of the electrolyte. Also the presence in the electrolyte of lime to regenerate the alkaline constituents as is common, see for example U. S. Patents 1,864,652 and 2,180,955, gives rise to certain difficulties when potassium hydroxide is the sole alkaline constituent of the electrolyte. For example, the delayed decomposition of the peroxide often brings about an accumulation of gas within the mass of the regenerating material or solid by-products of the cell reactions. This accumulation not infrequently is accompanied by a rise in the liquid level and the overflow of electrolyte solution from the cell.

It has been found that improved electrolyte performance may be obtained when the alkaline electrolyte consists primarily of sodium hydroxide and potassium hydroxide. Other conventional electrolyte additives such as lime may also be present in the electrolyte of the invention. The improvements contemplated for the electrolyte of the invention are obtained when potassium hydroxide comprises from 30% to 80% of the alkaline constituent and sodium hydroxide from 70% to 20%. A preferred electrolyte for normal cell use comprises molar concentrations of sodium hydroxide and potassium hydroxide that are approximately equal. When discharge conditions are more severe, higher proportions of the potash are required, e. g., 60% to 80% of the molar concentration.

Table I below demonstrates the effectiveness of an electrolyte regenerator in electrolytes of varying concentrations of sodium hydroxide and potassium hydroxide. The electrolyte regenerating material employed for the purposes of the tests was lime. The regenerator functions by reacting with the product of the reaction between the zinc anode and the alkaline constituent of the electrolyte. The compound formed by the reaction with the electrolyte regenerating material is an insoluble compound. As a result, the alkaline constituent of the electrolyte is reformed and made available for reuse in the main cell reactions. Specifically in the present tests soluble alkaline zincate was converted to insoluble calcium zincate. It will be seen from the table that generally at room temperatures and always at lower temperatures the conversion of the soluble alkaline zincate to the insoluble calcium zincate proceeded much more expeditiously in the electrolyte containing both sodium hydroxide and potassium hydroxide than in the electrolytes containing either sodium hydroxide or potassium hydroxide alone.

*Table I*

| | Days to Effect a 50% Conversion of $ZnO_2$ to $CaZn_2O_3$ | |
|---|---|---|
| | Room Temperature (71° F.) | Refrigerator (37° F.) |
| 6.0 Normal NaOH | 2.3 | 5.5 |
| 3.0 Normal NaOH<br>3.0 Normal KOH | 1.5 | 1.7 |
| 6.0 Normal KOH | 1.5 | 2.3 |
| 7.0 Normal NaOH | 14.0 | 10.0 |
| 3.5 Normal NaOH<br>3.5 Normal KOH | 4.0 | 4.5 |
| 7.0 Normal KOH | 5.5 | 5.2 |

Particularly good results have been obtained when the electrolyte of the invention is used in conjunction with a plastic-bonded carbon electrode. A preferred cell is described with particularity in a copending application Serial No. 381,388, filed September 21, 1953, now U. S. Patent No. 2,724,010. In that cell a liquid-impermeable carbon electrode comprising granular air-depolarizable carbon bonded together with a vinyl resin was employed. The operation of the cell with the electrolyte of the invention and the resin-bonded electrode is particularly good at low temperatures and at high discharge rates. The inclusion in the electrode of a peroxide decomposition catalyst has been found to be beneficial.

The preferred cell referred to above is shown in the accompanying drawing.

In the drawing:

Fig. 1 is a view of the cell.

Fig. 2 is a cut-away view of the cathode and anode assembly of the preferred cell.

The cell 1 filled with electrolyte as indicated on the drawing has a plastic bonded carbon electrode 2, mounted on a metal grid 3. The mounted carbon electrode 2 is enclosed in a plastic case 4 with a similar mounted electrode defining an air space between the grids 3. Zinc electrodes 5 are suspended from the plastic case 4 and appropriate terminals are provided for the electrodes.

A conventional air-depolarized cell with a sodium hydroxide electrolyte and a carbon cathode containing a peroxide decomposition catalyst exhibits serious carbon degradation at temperatures of about 0° F. even at current densities as low as 0.3 ampere per square foot. With a plastic-bonded electrode as described above which makes possible more effective use of decomposition catalyst additions and an electrolyte containing as its alkaline constituent about 40% potassium hydroxide and 60% sodium hydroxide, satisfactory performance is obtained at temperatures of about 0° F. and current densities up to five amperes per square foot.

A preferred electrolyte comprises an aqueous solution of sodium hydroxide and potassium hydroxide. The normality of the solution based on its alkaline content should be between about 4 and 8 and for best results between 6 and 7. In this solution potassium hydroxide accounts for from 30% to 80% and sodium hydroxide accounts for from 70% to 20% of the alkalinity. These percentages are based on the concentration of the hydroxyl ion. In general as the alkalinity of the electrolyte increases the proportion of potassium hydroxide in the electrolyte should increase. An electrolyte regenerating material, such as lime, in an amount equal to the weight of the alkaline constituent may also advantageously be added to the electrolyte.

What is claimed is:

1. The combination in an air-depolarized cell of a plastic-bonded carbon electrode of granular, air-depolarizable carbon and an alkaline electrolyte comprising an aqueous solution of potassium hydroxide and sodium hydroxide, said potassium hydroxide and sodium hydroxide being present in such proportions that the potassium hydroxide is the source of from 30% to 80% of the hydroxyl ion concentration in the electrolyte.

2. The combination in an air-depolarized cell of a plastic-bonded carbon electrode of granular, air depolarizable carbon containing a peroxide decomposition catalyst and an alkaline electrolyte comprising an aqueous solution of potassium hydroxide and sodium hydroxide, said potassium hydroxide and sodium hydroxide being present in such proportions that the potassium hydroxide is the source of from 30% to 80% of the hydroxyl ion concentration in the electrolyte.

3. The combination in an air-depolarized cell of a plastic-bonded carbon electrode of granular, air-depolarizable carbon containing a peroxide decomposition catalyst, an electrolyte regenerator, and an alkaline electrolyte comprising an aqueous solution of potassium hydroxide and sodium hydroxide, said potassium hydroxide and sodium hydroxide being present in such proportions that the potassium hydroxide is the source of from 30% to 80% of the hydroxyl ion concentration in the electrolyte.

4. The combination in an air-depolarized cell of a bonded carbon electrode of the type which normally tends to disintegrate due to the presence of crystalline peroxide in its pores, and an alkaline electrolyte comprising an aqueous solution of potassium hydroxide and sodium hydroxide, said potassium hydroxide and sodium hydroxide being present in such proportions that the potassium hydroxide is the source of from 30% to 80% of the hydroxyl ion concentration in the electrolyte, such electrolyte tending to inhibit such disintegration of said electrode by inhibiting formation of crystalline peroxide within its pores.

References Cited in the file of this patent

UNITED STATES PATENTS

| | | |
|---|---|---|
| 1,562,805 | Sutter | Nov. 24, 1925 |
| 2,077,562 | Heise et al. | Apr. 20, 1937 |
| 2,180,839 | Schumacher et al. | Nov. 21, 1939 |
| 2,180,955 | Heise et al. | Nov. 21, 1939 |
| 2,422,045 | Ruben | June 10, 1947 |
| 2,641,623 | Winckler | June 9, 1953 |
| 2,724,010 | Fisher et al. | Nov. 15, 1955 |

OTHER REFERENCES

International Critical Tables, vol. III, page 99; vol. IV, page 67.